United States Patent
Yamashita et al.

(10) Patent No.: US 10,425,490 B2
(45) Date of Patent: Sep. 24, 2019

(54) SERVICE INFORMATION AND CONFIGURATION USER INTERFACE

(71) Applicant: Uber Technologies, Inc., San Francisco, CA (US)

(72) Inventors: Yuhki Yamashita, San Francisco, CA (US); Didier Patrick Hilhorst, San Francisco, CA (US); Bryant Jow, San Francisco, CA (US); Peter Ng, San Francisco, CA (US); Brian Tolkin, San Francisco, CA (US); Bin Pan, Belmont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/395,406

(22) Filed: Dec. 30, 2016

(65) Prior Publication Data

US 2018/0091604 A1    Mar. 29, 2018

Related U.S. Application Data

(60) Provisional application No. 62/399,660, filed on Sep. 26, 2016.

(51) Int. Cl.
  *G06Q 50/30*   (2012.01)
  *H04L 29/08*   (2006.01)
  (Continued)

(52) U.S. Cl.
  CPC .......... *H04L 67/16* (2013.01); *G06Q 10/047* (2013.01); *G06Q 20/201* (2013.01); *G06Q 20/28* (2013.01);
  (Continued)

(58) Field of Classification Search
  CPC ......... H04L 67/16; H04L 67/18; G06Q 20/21; G06Q 20/28; G06Q 20/3224; G06Q 50/30; G06Q 10/06311; G08G 1/202
  See application file for complete search history.

(56) References Cited

U.S. PATENT DOCUMENTS 6,668,177 B2   12/2003   Salmimaa
9,922,469 B1   3/2018    Ashton
(Continued)

FOREIGN PATENT DOCUMENTS

CA          2975002        8/2016
WO   WO 2010142862       12/2010

OTHER PUBLICATIONS

Borison, Rebecca, Uber Brings Its SUV Fleet to NYC, Jul. 30, 2014, Business Insider, p. 1, https://web.archive.org/web/20140730192746/http://www.businessinsider.com/ubers-uberxl-fits-six-people-2014-7.*

(Continued)

*Primary Examiner* — Rupangini Singh
(74) *Attorney, Agent, or Firm* — Mahamedi IP Law LLP

(57) ABSTRACT

A network computer system can receive data indicating a first service location from a computing device of a requesting user via an executing service application and determine data indicating a second service location. Based the first and second service locations, the network computer system can compute an upfront cost for each of a plurality of service options for completing an on-demand service for the requesting user. The network computer system can transmit data associated with the upfront cost for each of the plurality of service options to the computing device to enable a plurality of selectable graphic features to be displayed as (Continued)

part of a user interface on the computing device. Each of the graphic features can indicate the upfront cost for the corresponding service option.

16 Claims, 9 Drawing Sheets

(51) Int. Cl.
*G06Q 10/04* (2012.01)
*G06Q 20/28* (2012.01)
*G06Q 20/32* (2012.01)
*G06Q 20/20* (2012.01)

(52) U.S. Cl.
CPC ......... *G06Q 20/3224* (2013.01); *G06Q 50/30* (2013.01); *H04L 67/18* (2013.01)

(56) References Cited

U.S. PATENT DOCUMENTS

| | | | |
|---|---|---|---|
| 2002/0034292 A1 | 3/2002 | Tuoriniemi | |
| 2005/0177799 A1 | 8/2005 | Knight | |
| 2006/0059023 A1* | 3/2006 | Mashinsky | G06Q 10/02 705/5 |
| 2010/0076795 A1* | 3/2010 | Steir | G06Q 30/06 705/5 |
| 2010/0179750 A1* | 7/2010 | Gum | G01C 21/362 701/533 |
| 2011/0099040 A1 | 4/2011 | Felt | |
| 2011/0238289 A1 | 9/2011 | Lehmann | |
| 2013/0090950 A1 | 4/2013 | Rao | |
| 2013/0132140 A1* | 5/2013 | Amin | G06Q 10/02 705/7.13 |
| 2013/0268406 A1 | 10/2013 | Radhakrishnan | |
| 2013/0282283 A1 | 10/2013 | Bondesen | |
| 2014/0129951 A1* | 5/2014 | Amin | G06Q 50/30 715/738 |
| 2014/0195972 A1 | 7/2014 | Lee | |
| 2014/0364150 A1 | 12/2014 | Marti | |
| 2015/0161564 A1* | 6/2015 | Sweeney | G06Q 10/063114 705/338 |
| 2015/0248689 A1* | 9/2015 | Paul | G06Q 50/30 705/14.23 |
| 2016/0048804 A1* | 2/2016 | Paul | G06Q 10/08355 705/338 |
| 2016/0078374 A1 | 3/2016 | Lippow | |
| 2016/0370194 A1* | 12/2016 | Colijn | G01C 21/343 |
| 2017/0013408 A1 | 1/2017 | Grzywaczewski | |
| 2017/0059347 A1* | 3/2017 | Flier | G01C 21/3605 |
| 2017/0169366 A1* | 6/2017 | Klein | G06Q 10/025 |
| 2017/0193458 A1 | 7/2017 | Marco | |
| 2017/0357408 A1* | 12/2017 | Anglin | H04W 4/02 |

OTHER PUBLICATIONS

Hilen, Brittany, Uber and Google bring, WiFi to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326/.*
Jain et al., "Contextual Adaptive User Interface for Android Devices", Annual IEEE India Conference (INDICON), IEEE, pp. 1-4 Year: 2013) (Year: 2013).*
ISR and Written Opinion in PCT/US2017/053469 dated Dec. 8, 2017.
Cody Toombs: Maps v.9.19 Introduces New 'Driving Mode' with Traffic Update and ETAs, Audio Toggle for Navigation, and Timeline Seetings [APK Download and Teardown], Jan. 12, 2016 URL: http:// www.androidpolice. Com/2016/01/12/maps-v9-19 -introduces - new-driving-mode-with-traffic-updates -and-etas-audio-toggle-for- navigation- and-timeline-seetings-apk-download-teardown/.
Darrell Etherington: "Google Maps on Mobile Gets Uber Integration and More", May 6, 2014 URL: https//techcrunch.com /2014/05/06/google-maps-on-mobile- gets-uber-integration-and-more.
EESR issued in EP 16735494.3 dated May 18, 2018.

\* cited by examiner

SERVICE INFORMATION AND CONFIGURATION USER INTERFACE

CROSS-REFERENCE TO RELATED APPLICATIONS

This application claims the benefit of priority of Provisional U.S. patent application Ser. No. 62/399,660, filed Sep. 26, 2016; the aforementioned priority application being hereby incorporated by reference in its entirety.

BACKGROUND

User centric network services typically sequence users through a number of selection interfaces so that the user can specify certain information for a desired type of service, including service level selections and preferences. With enhancements in network and mobile technology, the number of on-demand services for user selection is also increasing, creating inconvenience for human operators. Moreover, the time needed for selection can occupy an interface device, creating performance issues and draining resources of the operative selection device.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
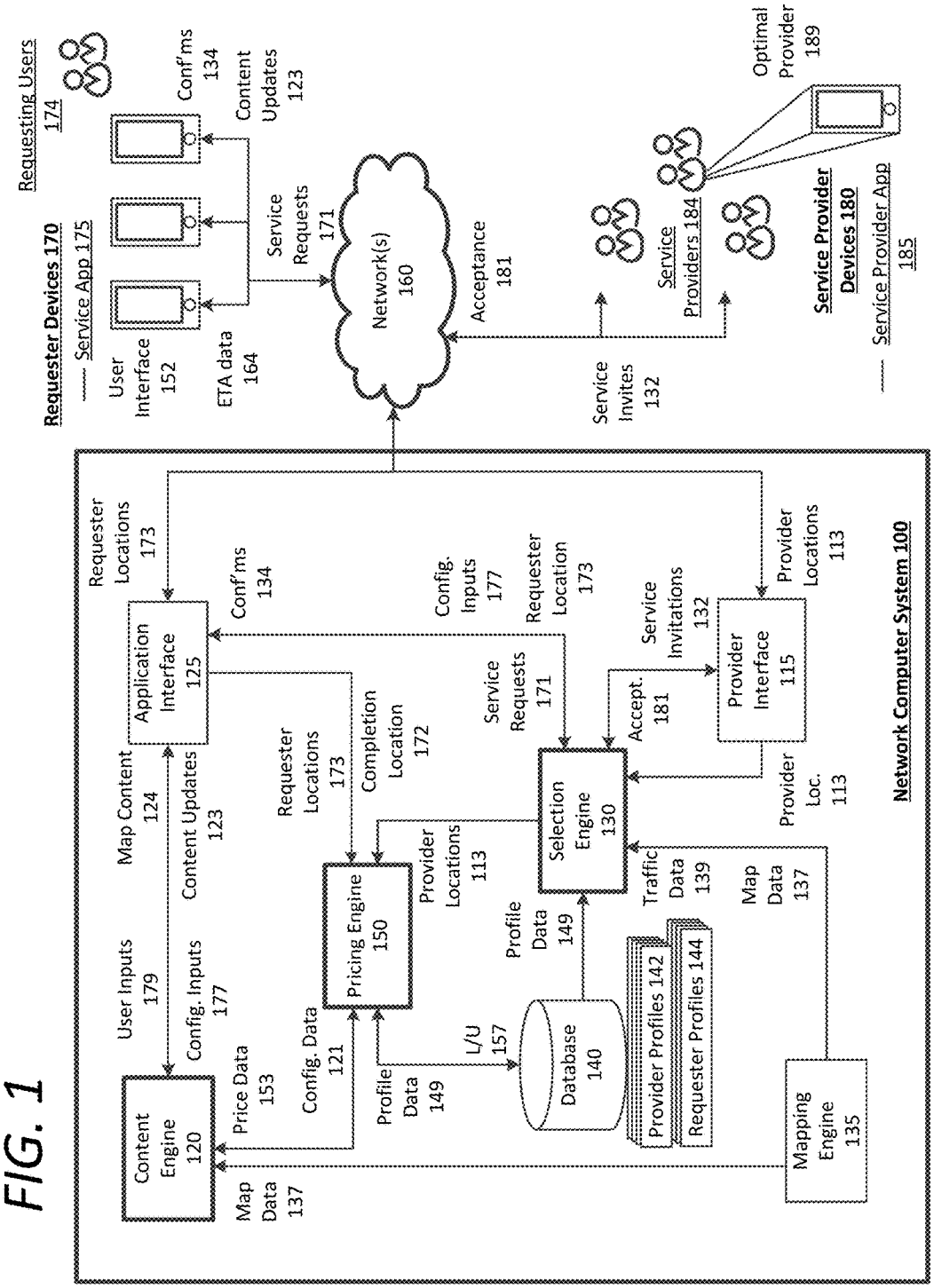
FIG. 1 is a block diagram illustrating an example network computer system in communication with user devices and service provider devices, in accordance with examples described herein.

A network computer system is described herein that manages an on-demand network-based service linking available service providers with requesting users throughout a given region (e.g., a metroplex such as the San Francisco Bay Area). In doing so, the network computer system can receive service requests for on-demand services (e.g., a transport service or a delivery service) from requesting users (e.g., a rider) via a designated service application executing on the users' mobile computing devices. Based on a detected location or an inputted location(s) (e.g., a pick-up location and/or destination location), the network computer system can identify a number of proximate service providers (e.g., available drivers) and transmit a service invitation to one or more service provider devices of the proximate service providers to fulfill the service request. In many examples, the service providers can either accept or decline the service invitation based on, for example, a service location being impractical for the service provider.

In determining an optimal service provider to fulfill or complete a given service request, the network computer system can identify a plurality of candidate service providers to fulfill or complete the service request based on a service location indicated in the service request. As provided herein, an "optimal" service provider corresponds to a service provider, from a candidate set of service providers that has been determined to be most suitable to completing a particular service request based on one or more factors. The factor(s) can comprise the service provider being closest to a rendezvous point with the requesting user, having a lowest estimated time of arrival (ETA) to the rendezvous point, an estimated collective value generated by the service provider in being selected as compared to other service providers, and other factors. In some aspects, the network computer system can identify a set of candidate service providers (e.g., twenty or thirty service providers within a certain proximity of the service location), and select an optimal service provider (e.g., a closest service provider to the rendezvous point, a service provider with the shortest estimated travel time from the rendezvous point, a service provider traveling to a location within a specified distance or specified travel time to an end location, etc.) from the candidate service providers to fulfill or complete the service request based on any of the above factors.

According to examples provided herein, a computing system is provided that causes a user interface specific to the service application to be generated on a display screen of a computing device of a requesting user. As described herein, the computing system can comprise a backend datacenter or server system(s) (e.g., comprising the network computer system) that hosts the on-demand network-based service. Additionally or alternatively, one or more processes described in connection with the computing system may be performed on the processing resources of the requesting user's mobile computing device via execution of the service application. Thus, the processes described herein can be wholly or partially executed by either the network computer system or the mobile computing device of the requesting user executing the service application.

In various examples described herein, the network computer system can establish a communication link with the computing device of the requesting user upon execution of the service application, and provide data corresponding to a plurality of service options for the on-demand service. In certain implementations, the network computer system can receive data indicating a service location (e.g., an end point for transport) from the computing device of a requesting user via user input utilizing the service application. The network computer can further receive or determine a current location or data indicating a rendezvous or start location from the requesting user's computing device (e.g., utilizing location-based resources of the computing device). For each of a set of service options, the network computer system can compute an upfront cost for the service for the requesting user (e.g., in the context of transport services, the cost to transport the requesting user from a start location to a destination location), and cause a set of graphic features to be displayed on a user interface of the requesting user's computing device, including features corresponding to or indicating at least the upfront cost for a corresponding service option. According to examples, each of the set of graphic features is selectable to request the on-demand service for the corresponding service option.

The network computer system can further manage a database of service provider profiles that indicate the qualified service types for each service provider. For example, a service provider (e.g., a driver) may operate a standard vehicle and can be qualified to provide carpooling and standard ride-sharing services. In further examples, the service provider may be a certified professional service provider and may provide a "black car" service. The service provider may own a luxury car and further provide a luxury vehicle service. Still further, the service provider's vehicle may qualify the service provider to provide a high capacity vehicle service (e.g., a sport utility vehicle or van service), or a luxury high capacity vehicle service. The service provider may be multi-lingual, and the service app may provide a graphic feature that enables a requesting user to request that the service provider speak a particular language. The service provider's vehicle can include certain features that qualify the service provider to provide additional services, such as a bike rack, disabled person services (e.g., a wheel chair lift), or the service provider may be certified in disability etiquette and/or assistance. The network computer system can store such information in the service provider's profile in order to filter candidate service providers within proximity of a requesting user in the selection process of fulfilling a service request.

In various implementations, the network computer system can receive location data indicating the current locations of service providers operating throughout the given region. As described herein, the network computer system can filter the service providers operating within proximity of a requesting user (e.g., based on the closest twenty or thirty service providers, or a specified set of service providers per service option). In addition to calculating an upfront cost for each service option, the network computer system can further determine an estimated time of departure from the user's current location and/or an estimate time of completion of the service (e.g., an estimated time to drop off the requesting user at a destination using a standard service option or a carpooling service option). The displayed graphic features can be categorized in terms of cost, estimated departure time from a rendezvous point, estimated time of completion, and/or service option. For example, the graphic features can be displayed under categories comprising an economy category including lower cost service options, a premium category including higher cost service option, a high-capacity category if the requesting user requires a large vehicle, and/or a specialized category for specialized requests (e.g., a bike rack, disability features, language requests, etc.). The network computer system can selectively provide information for each graphic feature representing each service option.

As described herein, a graphic feature can be selected to enable and/or configure one or more additional features on the user interface. This user selection can comprise a specific user input on the graphic feature that causes background data and subsequent screens to be updated in accordance with service data corresponding to the selected graphic feature. For example, a selection of a graphic feature representing a carpooling service can configure any subsequent information and screens to be prepopulated or otherwise correlated with data corresponding to the carpooling service (e.g., pricing information, estimated rendezvous time data, etc.). Accordingly, a user selection of a graphic feature can cause the selection of a configuration feature to be updated to reflect the selected service option. Thereafter, a user selection of the configuration feature can cause the network computer system (or service application executing on the computing device of the requesting user) to generate a configuration interface that enables the requesting user to configure various aspects of the service option. Example configurations for an on-demand transport service can include a requested number of available seats, Wi-Fi access, a car seat for a baby, audio or video configurations (e.g., a preferred radio station or video broadcast channel), a specified departure time, virtual reality or augmented reality features, and the like. Based on the user configurations, the network computer system can update the upfront cost of the service option on the graphic feature for the configured service option. In variations, the user settings on the configuration interface can act as a filter for the network computer system in filtering service options and/or individual service providers.

In response to a user selection of the service request feature, the computing device of the requesting user can transmit, over one or more networks, data corresponding to a service request to the (backend) network computer system. In some aspects, the service request can include at least a service location and/or a destination location. For example, the user interface of the service application can utilize a destination-first approach to submitting a service request that enables the upfront cost calculations per service option. Based on the current location or rendezvous point and selected service option, the network computer system can select and invite an optimal service provider to fulfill the service request, and transmit a confirmation to the computing device of the requesting user indicating that the selected service provider is en route to the rendezvous location (e.g., traveling to a pick-up location).

Among other benefits, the examples described herein achieve a technical effect of providing users of an on-demand service with greater upfront data (e.g., updated pricing information for each service option of the on-demand service) for making service selections, enabling service configuration according to user needs (e.g., selecting a number of seats), providing greater selection in carpooling services, and improving the overall user experience and understandability of the on-demand service.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). AVs or SDVs refer to vehicles that operate or can be operated in a state of automation with respect to steering, propulsion, and/or braking. Some vehicles may include human-based controls (e.g., a steering wheel, gear shifter, brake pedal, and accelerator pedal), and can be switch between a fully autonomous mode, partial autonomous mode, and/or manual control mode. In fully autonomous mode, AVs or SDVs can operate on public roads without any human assistance utilizing a sensor suite and data processing systems to provide an awareness of the AV's or SDV's situational environment. In processing sensor data from the sensor suite—which can comprise a number of sensor systems such as LIDAR, monocular camera, stereoscopic camera, infrared proximity-based, sonar, or radar systems— the AV or SDV can operate its control mechanisms to safely control and maneuver through various road and traffic infrastructures typical of both urban and rural transportation environments.

System Description

FIG. 1 is a block diagram illustrating an example network computer system in communication with computing devices of requesting users and service providers, in accordance with examples described herein. The network computer system 100 can manage an on-demand network-based service that connects requesting users 174 with service providers 184 that are available to provide services to the users 174. In one example, the on-demand network-based service can provide a platform that enables ride sharing services between requesting users 174 and available service providers 184 by way of a service application 175 executing on the computing devices 170 of the requesting users 174, and a service provider application 185 executing on the computing devices 180 of service providers 184. As used herein, a requesting user's computing device 170 and a service provider's computing device 180 can comprise computing devices with functionality to execute a designated application corresponding to the on-demand service managed by the network computer system 100. In many examples, the requesting user's computing device 170 and the service provider's computing device 180 can comprise mobile computing devices, such as smartphones, tablet computers, VR or AR headsets, on-board computing systems of vehicles, personal computers, laptops, wearable computing devices, and the like.

The network computer system 100 can include an application interface 125 to communicate with requester devices 170 over one or more networks 160 via the service application 175. According to examples, a requesting user 174 wishing to utilize the network service can launch the service application 175 and transmit a service request 171 over the network 160 to the network computer system 100. In certain implementations, the requesting user 174 can view multiple different service options managed by the network computer system 100. For example, in the context of on-demand transport services, the service options can include a ride-pooling service, a standard ride share service, a luxury vehicle service, a high-capacity van or large vehicle service, a professional driver service (e.g., where the service provider is certified), a self-driving vehicle transport service, other specialized ride services, and the like. In some examples, the network computer system 100 can utilize the service provider locations 113 to provide the requester devices 170 with ETA data 164 of proximate service providers for each respective service option. For example, the service application 175 can enable the requesting user 174 to view information corresponding to each service option.

As described herein, the content shown on the user interface 152 of the service application 175 can be updated by way of a content engine 120 and pricing engine 150 of the network computer system 100, and can comprise a number of graphic features that correspond to each service option providing the requesting user 174 with detailed information to facilitate in making a service option selection. The user can interact with the user interface 152 of the service app 175 to select a particular service option and transmit a service request 171 to the network computer system 100.

In some examples, the service request 171 can include a rendezvous location within a given region (e.g., a metropolitan area managed by one or more datacenters corresponding to the network computer system 100) in which a matched service provider is to rendezvous with the requesting user 174. The rendezvous location can be inputted by the user by setting a location pin on a user interface of the service app 175, or can be determined by a current location of the requesting user 174 (e.g., utilizing location-based resources of the requester device 170). Additionally, the requesting user 174 can further input a service completion location (e.g., a destination) during or after submitting the service request 171.

According to examples described herein, the user interface 152 of the service application 175 can query the requesting user 174 for a service completion location, or otherwise provide input features on the user interface 152 to receive data indicating a desired completion location 172. The pricing engine 150 can perform dynamic cost computations based on service provider supply and provider locations 113, the requester's location 173, and/or the service completion location 172 inputted by the requesting user 174. As provided herein, the pricing engine 150 can perform pricing calculations according to a set formula or algorithm for each specified service option, and provide price data 153 to the content engine 120 to enable the content engine 120 to provide content updates 123 to the requester device 170. The content updates 123 can comprise graphic features indicating ETA data 164 corresponding to an ETA of a representative service provider for each service option. Additionally or alternatively, the content updates 123 can include selectable graphic features providing pricing information for each service option (e.g., an estimated or guaranteed upfront price to transport the user 174 to an inputted destination).

In accordance with some examples, the network computer system 100 can include a database 140 storing requester profiles 144 and/or service provider profiles 142. The database 140 can be accessible by the pricing engine 150 to, for example, determine the service option qualifications of the service providers 184 by performing lookups 157 in the service provider profiles 142. The service provider profile 142 for a particular service provider can include identifying information, such as vehicle information (e.g., vehicle model, year, license plate number, and color), the service provider's overall rating, qualified service options (e.g., professional service provider, certified assistance service provider, etc.), experience, earnings, and the like. In variations, the service provider profile 142 can further include the service provider's preferences, such as preferred service areas, routes, hours of operation, and the like. Accordingly, the pricing engine 150 can correlate the service provider locations 113 of a group of service providers 184—within proximity to the current location 173 of the requesting user 174—with the profile data 149 for those service providers 184 to determine one or more service options that each of the service providers 184 can provide for the requesting user 174.

Utilizing the profile data 149, service provider locations 113, and the service completion location 172, the pricing engine 150 can provide upfront pricing data 153 to the content engine 120 indicating a current upfront cost for each of the service options. As provided herein, the service options can comprise one or more carpooling service options, a standard ride-sharing service option (e.g., a normal car and operator), premium ride-sharing service options (e.g., black car, luxury vehicle, high capacity, luxury high-capacity, and/or professional driver services), and can further include any number of specialized service request features, such as disability vehicle features and/or assistance, baby or toddler seat, bike rack, pick-up truck, roof racks, audio and/or video configurations, Wi-Fi access requests, and the like. Such service options and available configuration request features can be indicated in the profile data 149 of the service provider profiles 142. In certain examples, the pricing engine 150 can further utilize the service provider locations 113 and profile data 149 for those service providers to factor in a supply and demand calculation to determine the price data 153 for each service option, or for selected service options (e.g., carpooling).

In variations, the pricing engine 150 can perform certain optimization operations to identify opportunities in which cost and or ETA can be reduced. For example, the pricing engine 150 can utilize map data 137 from a mapping engine 135 to identify the specific routes and directions of travel for each service provider 184 (or for a certain class of service providers, such as carpool service providers), and determine one or more rendezvous points that require the requesting user 174 to walk a certain distance, but would decrease at least one of ETA or cost. In identifying such rendezvous locations, the pricing engine 150 can provide the content engine 120 with price data 153 and service option information so that the content engine 120 can generate a dedicated graphic feature that includes the reduced price and an indicator that the requesting user 174 must walk or travel a certain distance. According to examples, a user input 179 selecting of this dedicated graphic feature can cause the content engine 120 to provide mapping content showing the rendezvous point(s) and walking directions to the rendezvous point(s).

As further provided by examples herein, the user interface 152 can enable the requesting user 174 to configure a number of features or parameters of a selected service option. As such, the user interface 152 can include a configuration feature selectable to cause a configuration interface to be displayed on the requester device 170. The requesting user 174 can provide service configuration inputs 177 to make certain requests described herein (e.g., a requested number of seats for a carpooling service). In various examples, the service configuration inputs 177 provided by the requesting user 174 can cause the price data 153 for the selected service option to change. Accordingly, the content engine 120 can provide configuration data 121 to the pricing engine 150, which can recalculate the price data 153 for the selected service option based on the configuration inputs 177. The recalculated price data 153 can be submitted to the content engine 120, which can provide a content update 123 to the requester device 170 to display the updated price. In some aspects, the updated price data 153 can be provided to the requesting user 174 in response to a user input on a selection feature (e.g., a "done" icon) once all configurations are inputted. In variations, the updated price data 153 can be provided dynamically to the requesting user 174 as each configuration is inputted. Thus, in such implementations, the requesting user 174 can view a dynamically updated cost for the ride while inputting the service configurations 177 in real time.

In further examples, the user interface 152 can provide the requesting user 174 with a set of tolerance options that can result in a lower service cost. For example, the service application 175 can generate a tolerance interface enabling the requesting user 174 to set a number of tolerance parameters, such as flexible rendezvous time, flexible drop-off time, flexible service location (e.g., causing the requesting user 174 to walk beyond a threshold relative distance, such as more than hundred meters), flexible ride time (e.g., for carpooling services that can make additional stops), and the like. Each tolerance parameter set by the requesting user 174 can affect the price data 153. Thus, the content engine 120 can provide the service configuration data 121—corresponding to the tolerance parameters set by the user 174—to the pricing engine 150 which can recalculate the price data 153 for the selected service option accordingly.

In variations, the pricing engine 150 can identify the supply conditions for certain ride service option (e.g., the number and relative directions of travel of ride-pool service providers 184) to preemptively provide updated price data 153 for certain tolerance parameters. Thus, the pricing engine 150 can provide a price data 153 for each tolerance parameter on the tolerance interface that enables the requesting user 174 to view price data 153 prior to the requesting user 174 setting any of the tolerance parameters. As provided herein, such price data 153 for each selectable tolerance parameter can be an upfront guaranteed price or can include an estimated of cost savings for the selected service option. In certain variations, the pricing engine 150 can dynamically calculate price data 153 updates in response to configuration inputs 177 on the tolerance interface. For such variations, the content engine 120 can dynamically update the user interface 152 to display the updated price information 153 based on the configuration inputs 177 on the tolerance interface.

In various implementations, the network computer system 100 can further include a selection engine 130 to process the service requests 171 in order to ultimately select from a pool of service providers 184 operating throughout the given region to service the service requests 171. The network computer system 100 can include a service provider interface 115 to communicate with the service provider devices 180 via the service provider application 185. In accordance with various examples, the service provider devices 180 can transmit their current locations using location-based resources of the service provider devices 180 (e.g., GPS resources). These service provider locations 113 can be utilized by the selection engine 130 to identify a set of candidate service providers 184, in relation to the service location, that can service the service request 171.

The database 140 can further be accessible by the selection engine 130 in matching a candidate service provider with a requesting user 174. For example, the requesting user 174 can preconfigure the requester profile 144 with certain preferences (e.g., preferred service options) and requirements (e.g., disability assistance), and can provide ratings for service providers 184 that have provided transportation to the requesting user 174. In some examples, other information can be provided by the requesting user 174, such as comments and complaints, which can be utilized by the network computer system 100 in maintaining and updating the requesting user's 174 requester profile 144. Historical data corresponding to the requesting user's 174 utilization of the on-demand service can also be analyzed to independently determine certain inclinations or preferences of the requesting user 174. For example, the historical data can indicate a rate of usage (e.g., once per week), common destinations and service locations, and favored service options. The selection engine 130 can utilize the user information in the requester profile 144 of the requesting user 174 upon receiving a service request 171, in order to determine an optimal service provider 189 from the candidate set of service providers 184. The selection engine 130 can further utilize service provider information 149 from the service provider profiles 142 in order to determine an optimal service provider 189 to fulfill or complete a particular service request 171.

Once the user 174 has configured a service option and/or selected a service option, the user 174 can select a request feature on the service app 175 that causes the requester device 170 to generate and transmit a service request 171 to the network computer system 100. In response to the service request 171, the selection engine 130 can initially filter service providers based on the requested service option by the requesting user 174 to identify a set of candidate service providers 184 to fulfill the service request 171. In certain implementations, the selection engine 130 can further filter the candidate set of service providers 184 by utilizing the profile data 149 for each of the candidate set of service providers 184, as well as the current locations, distances from the service location, and/or respective ETAs to the service location. Based on the profile data 149 for each candidate service provider 184, their respective locations and/or ETAs, information in the requester profile 144, and profile data 149 from the service provider profiles 142, the selection engine 130 can determine an optimal service provider 189 from the candidate set of service providers 184, and transmit a service invitation 132 to that service provider 189 to fulfill the service request 171.

In certain examples, the network computer system 100 can also select a proximate self-driving vehicle (SDV) to fulfill the service request 171. Thus, the pool of proximate candidate service providers in relation to a service location can also include one or more SDVs operating throughout the given region.

In some aspects, the network computer system 100 can include a mapping engine 135, or can utilize a third-party mapping service, to generate map data 137 and or traffic data 139 in the environment surrounding the service location. The selection engine 130 can utilize the current locations 113 of the service providers 184, the map data 137, and/or the traffic data 139 in order to select the optimal service provider 189 to service the service request 171. As provided herein, the optimal service provider 189 can be a service provider that is closest to the requesting user 174 or the service location with respect to distance or time, or can be a proximate service provider that is optimal for other reasons, such as the service provider's experience, the amount of time the service provider has been on the clock, the service provider's current earnings, and the like.

In further examples, the selection engine 130 can receive the service configuration inputs 177 corresponding to user inputs 179 on the configuration interface and/or tolerance interface of the service application 175. The selection engine 130 can utilize the configuration inputs 177—as well as the selected service option—to filter the candidate set of service providers 184. The resultant filtered set can comprise service providers that satisfy the selected ride service option, and each of the specialized configuration requests and/or tolerance parameters configured by the requesting user 174. In many aspects, the selection engine 130 can then determine an optimal service provider 189 from the filtered set of service providers to fulfill the service request 171. As described herein, the optimal service provider 189 may be selected based on having a shortest distance and/or time to the service location, or may be selected based on other factors, such as localized service provider supply in the present area, proximate areas, and other valuation metrics.

Once the optimal service provider 189 is selected, the selection engine 130 can generate a service invitation 132 to service the service request 171, and transmit the service invitation 132 to the optimal service provider 189 via the service provider application 185 executing on the optimal service provider's computing device 180. Upon receiving the service invitation 132, the optimal service provider 189 can either accept or reject the invitation 132. Rejection of the invitation 132 can cause the selection engine 130 to determine another optimal service provider from the candidate set of service providers 184 to service the service request 171, or can cause the selection engine 130 to determine a new set of candidate service providers from which to select another service provider. If the optimal service provider 189 accepts (e.g., via an acceptance input), then the acceptance input 181 can be transmitted back to the selection engine 130, which can generate and transmit a confirmation 134 of the optimal service provider 189 to the requesting user 174 via the service application 175 executing on the requesting user's 174 computing device 170.

According to examples provided herein, the content engine 120 can manage the manner in which content is displayed on the requester devices 170 and/or the service provider devices 180. Regarding the requester devices 170, the content engine 120 can provide content updates 123 based on user inputs 179 on the user interface 152 generated by the service application 175. For example, a user selection on a content feature of the service app 175 can cause the content engine 120 to generate a new screen on the service app 175, or cause a current screen to pivot between certain displayed features. In many examples, the content engine 120 can access a local database that includes user interface elements to provide the content updates 123 to the requester devices 170 in response to the user inputs 179. The user interface elements can comprise any number of screens with any number of selectable features, displayed information, input boxes, and/or spatial elements that can provide third party content from third party applications (e.g., news content, social media content, etc.). Furthermore, the user interface elements can include preconfigured features that enable the requester device 170 to enhance user experience.

In some examples, the content engine 120 can receive the requester location 173 of a requesting user 174 and input the requester location 173 onto map data 137 from the mapping engine 135. The map data 137 can further include service provider locations 113 of available service providers proximate to the requesting user 174. The content engine 120 can provide map content 124 to the requester device 170 of the requesting user 174 via the service application 175. In generating the map content 124, the content engine 120 can include virtual representations of proximate available service providers that can be filtered based on service option, as described herein. As further described herein, the map content 124 can be displayed on the user interface 152 to include information corresponding to a requested service option, such as ETA data 164 for the optimal service provider 189 to arrive at the rendezvous location, an estimated walk time for the requesting user 174 between a current location and the service location, and a total completion time for the service (e.g., a total ETA for transporting the requesting user 174 to an inputted destination).

Requester Device

Figure 2:
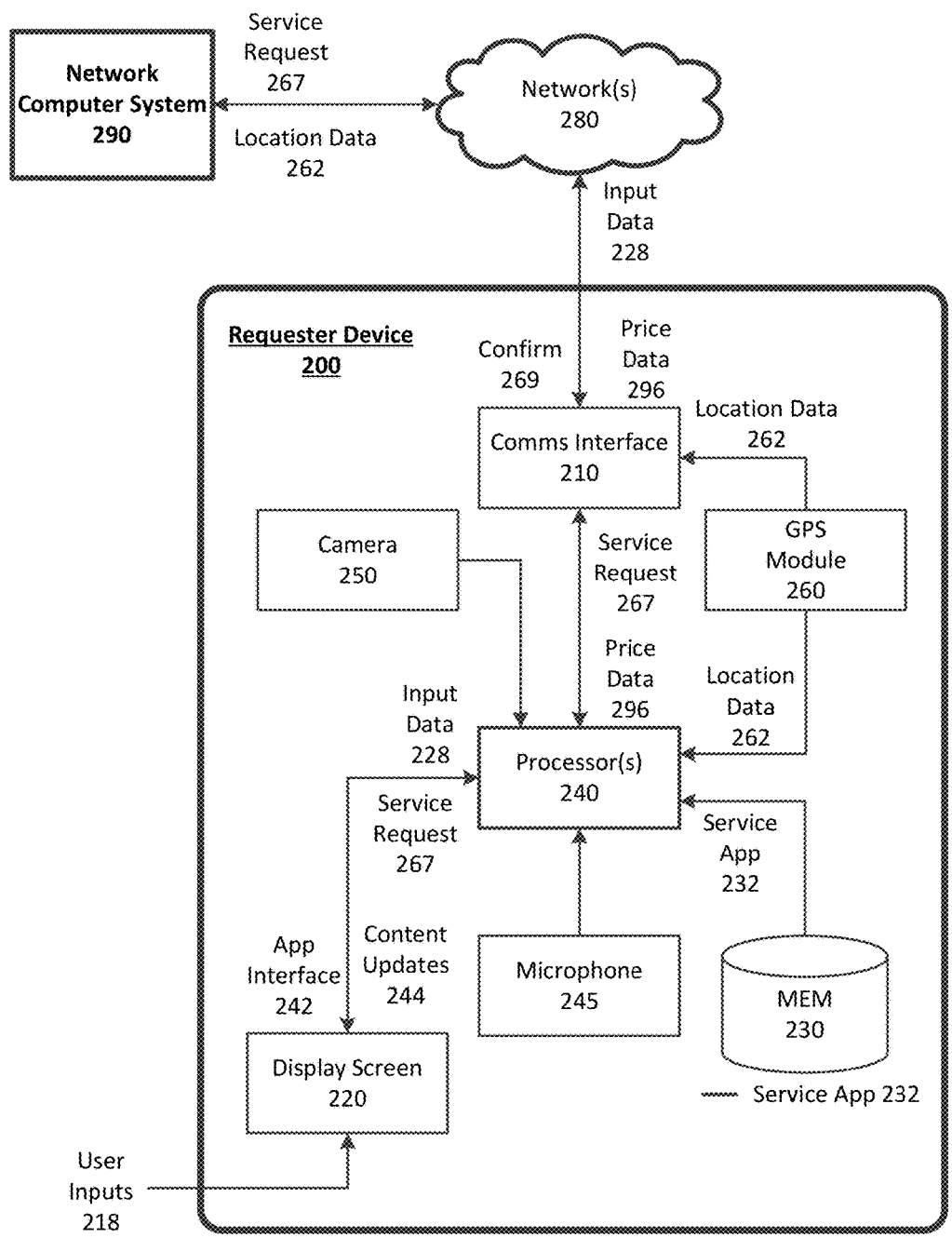
FIG. 2 is a block diagram illustrating an example computing device of a requesting user executing a designated service application for an on-demand network-based service, as described herein.

FIG. 2 is a block diagram illustrating an example computing device of a requesting user (i.e., a "requester device" 200) executing a designated service application for an on-demand network-based service, as described herein. In many implementations, the requester device 200 can comprise a mobile computing device, such as a smartphone, tablet computer, laptop computer, VR or AR headset device, and the like. As such, the requester device 200 can include typical telephony features such as a microphone 245, a camera 250, and a communication interface 210 to communicate with external entities using any type of wireless communication protocol. In certain aspects, the requester device 200 can store a designated application (e.g., a service app 232) in a local memory 230.

In response to a user input 218, the service app 232 can be executed by one or more processors 240, which can cause an app interface 242 to be generated on a display screen 220 of the requester device 200. The app interface 242 can enable the user to, for example, check current price levels and availability for various service options of the on-demand service. In various implementations, the app interface 242 can further enable the user to via information corresponding to the multiple service options, and select from the multiple service options, such as a carpooling service option, a regular ride-sharing service option, a professional ride service option, a van transport service option, a luxurious ride service option, and the like.

The user can generate a service request 267 via user inputs 218 provided on the app interface 242. According to examples described herein, the user can provide user inputs 218 on the app interface 242, which can be processed by the processor(s) 240 and/or the network computer system 290 over the network(s) 280 to provide content updates 244, as described herein with respect to the user interface examples shown in FIGS. 3A and 3B, and FIGS. 4A through 4I. In doing so, the service application 232 can enable a communication link with a network computer system 290 over the network 280, such as the network computer system 100 as shown and described with respect to FIG. 1. For example, to request transportation for an on-demand transport service managed by the network computer system 290, the user can input a service completion location (e.g., a destination) and/or a rendezvous location (e.g., a pick-up location), select a service option, configure the selected service option, and/or set any number of tolerance parameters. Furthermore, the app interface 242 can provide upfront information about each available service option, such as price data 292, an estimated time of arrival at the service location or destination, and the like.

In some aspects, the requester device 200 can transmit input data 228—corresponding to the user inputs 218 on the app interface 242—to the network computer system 290 that affects the price calculations of certain service options. The input data 228 can be processed by the network computer system 290 (e.g., by the pricing engine 150 shown in FIG. 1) to provide updated price data 296 for display on the application interface 242. As described herein, the price data 296 can be updated for each service option, which can be represented by selectable graphic features on the application interface 242 that enable the user to request the service option of the on-demand network-based service.

Once the ride service option is selected and the user wishes to submit a service request 267, the processor(s) 240 can transmit the service request 267 via the communications interface 210 to the backend network computer system 290 over a network 280. In response, the requester device 200 can receive a confirmation 269 from the network computer system 290 indicating the selected service provider and vehicle that will fulfill the service request 267 and rendezvous with the user at the rendezvous point. In various examples, the requester device 200 can further include a GPS module 260, which can provide location data 262 indicating the current location of the requesting user to the network computer system 290 to, for example, establish the rendezvous point and/or select an optimal service provider or autonomous vehicle to fulfill the service request 267.

As provided herein, one or more processes described in connection with the network computer system 100 of FIG. 1 can be performed by the processor(s) 240 of the requester device 200 executing the service application 232. For example, certain content updates 244 for the app interface 242 can be generated by the processor(s) 240 as opposed to the content engine 120 as shown and described with respect to FIG. 1. Accordingly, the content updates 244 corresponding to certain service application 232 screens and interface can be generated by the processor(s) 240 of the requester device 200 via execution of the service application 232.

User Interface Examples

Figure 3A:
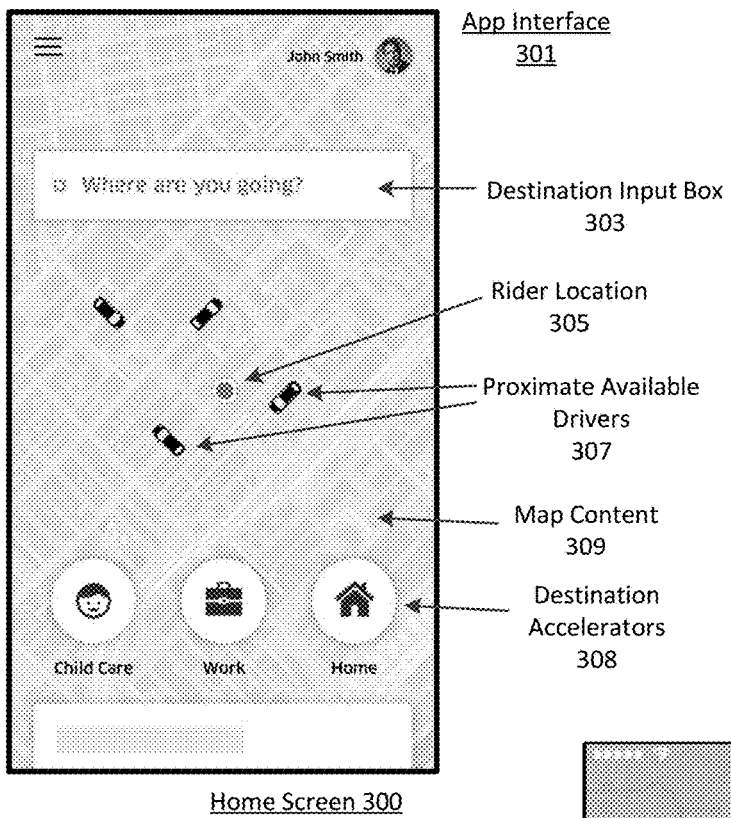
FIGS. 3A and 3B illustrate example user interfaces on a computing device of a requesting user, according to examples described herein.
Figure 3B:
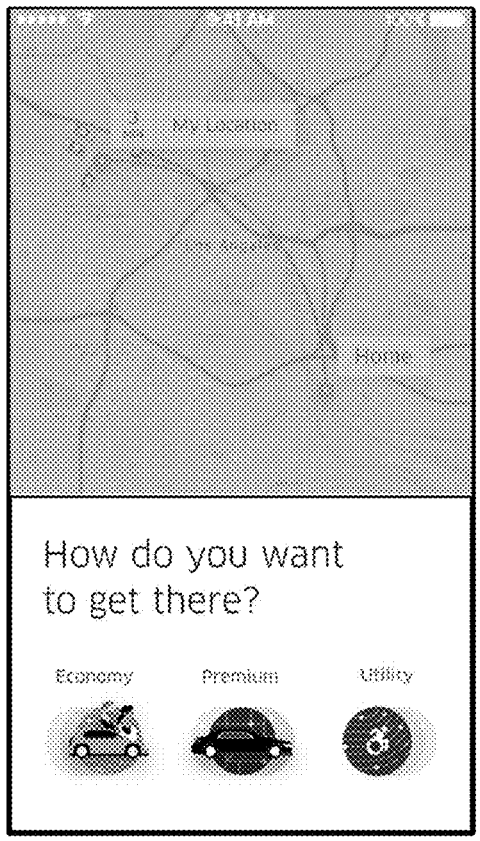

FIGS. 3A and 3B illustrate example user interfaces on a requester device, according to examples described herein. In the below description of FIGS. 3A and 3B, reference may be made to reference characters representing like features as shown and described with respect to FIGS. 1 and 2. Referring to FIG. 3A, execution of the service application 232 on the requester device 200 can cause an app interface 301 to be generated on the display screen 220. In some aspects, the app interface 301 can comprise an initial home screen 300, and can feature such elements as a destination input box 303, a location feature 305 indicating the user's current location, and virtual representations of proximate available service providers 307. In some aspects, the features of the home screen 300 can overlay or be included with map content 309 of the surrounding area of the user.

In some aspects, the home screen 300 can include a set of destination accelerator features 308 that the user can select to automatically configure a service request using a single selection input, or eliminating one or more additional steps in a normal request process. For example, the network computer system 290 can determine common or routine destinations for the user in connection with an on-demand transport service, such as the user's home, place of work, a child care facility or a gym. The network computer system 290 can further determine a routine ride type that the user utilizes when going to such locations. Thus, selection of a destination accelerator feature 308 can automatically pre-configure a pick-up request via automated destination input and ride service selection, and can utilize the user's current location to establish a pick-up location.

FIG. 3B illustrates an optional category selection screen 311 that enables the user to select from any number of ride service categories 312. For example, the category selection screen 311 can enable the user to filter the ride service options via an initial input selecting a particular category. As provided herein, selection of the "economy" feature can cause only carpooling, standard ride sharing, and high capacity ride service options to be selected.

Figure 4A:
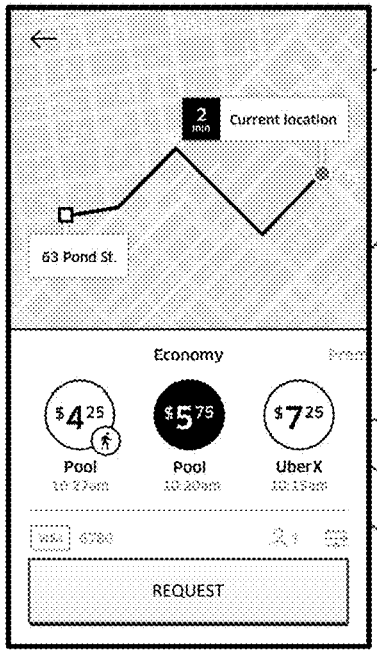
FIGS. 4A, 4B, 4C, 4D, 4E, 4F, 4G, 4H, and 4I illustrate other example user interfaces on a computing device of a requesting user, according to examples described herein.
Figure 4B:
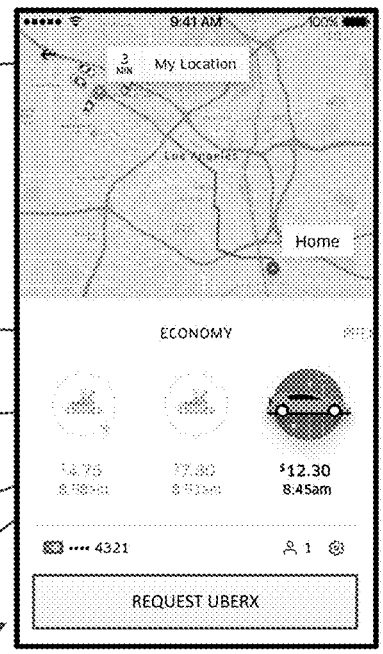

Upon inputting a destination in the destination input box 303 or selecting a destination accelerator 308, the requester device 200 can display a ride service selection interface, as shown in FIGS. 4A through 4D. Referring to FIGS. 4A and 4B, the ride service selection interface can include map content indicating a current location of the user and a window displaying the graphic features 408 corresponding to the ride service options 405. According to various examples, the user can select or make a selection of a particular ride service option 405 and select a request feature 410 to request a ride. As shown in FIGS. 4A and 4B, each of the ride service options 405 can be displayed with an upfront price 402 indicating a cost for the service to transport the user to the inputted destination.

In addition to the ride service option 405 and upfront price 402, the graphic features 408 can also show an estimated arrival time or an estimated time to destination (ETD) 403 from the service location for each particular ride service option 405. In some examples, the ride service selection interface can also display an estimated time for pickup by a service provider or an estimated departure time (EDT) feature 401 indicating an estimated shortest pick-up time for a selected ride service option, or a more general EDT for all the ride service options 405. As further provided herein, each of the ride service options 405 can be organized on the interface according to service categories 404. Thus, a window portion displaying the service categories 404 and the graphic features 408 can be scrollable (e.g., laterally scrollable as shown) to reveal additional ride service options 405 in additional service categories 404.

Figure 4C:
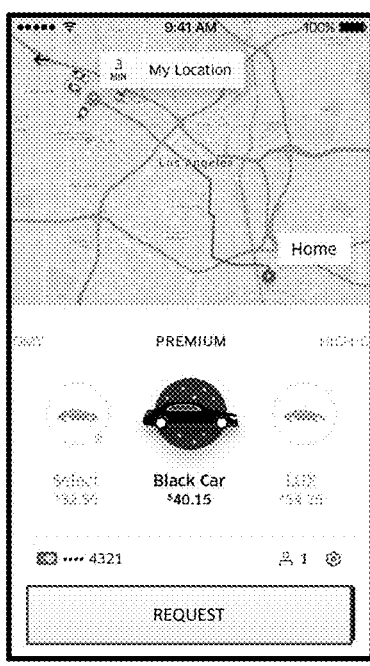
Figure 4D:

As shown in FIG. 4A, the user has selected a carpooling service option, and can input the request feature 410 to lock in the displayed price and transmit a service request to the network computer system 290. As shown in FIG. 4B, the user has selected the standard ride-sharing service (e.g., personalized service provider and vehicle with no additional passengers), and can select the request feature 410 to request the selected service at the displayed price. Referring to FIG. 4C, the user has scrolled to the premium categories and selected a black car service option. In some aspects, selection of a non-pooling service option can also cause the service application 232 to display a proposed route 416 to the destination. Furthermore, as shown in FIGS. 4A through 4D, the ride service selection interface include a configuration feature 412 that is selectable to generate a configuration interface as shown in FIG. 4G. Referring to FIG. 4D, the user has scrolled further to display a set of specialized service options 414 on the ride service selection interface. As shown in FIG. 4D, the specialized service options 414 can include certain disability assistance services or language requests.

Figure 4E:

In some aspects, the service application 232 can also suggest alternative pick-up points 422, as shown in FIG. 4E. These service locations 422 can be mandated by local rules and regulations (e.g., airport rules), or may result from an optimization calculation by the service application 232 or the network computer system 290 to reduce wait time and/or cost. In one example, each of the alternative pick-up points 422 can be selectable on map content (as shown in FIG. 4E). User selection of a particular alternative pick-up point can, for example, cause additional information to be displayed (e.g., price update information), or can input the selected location as the rendezvous point for the user and service provider.

Figure 4F:
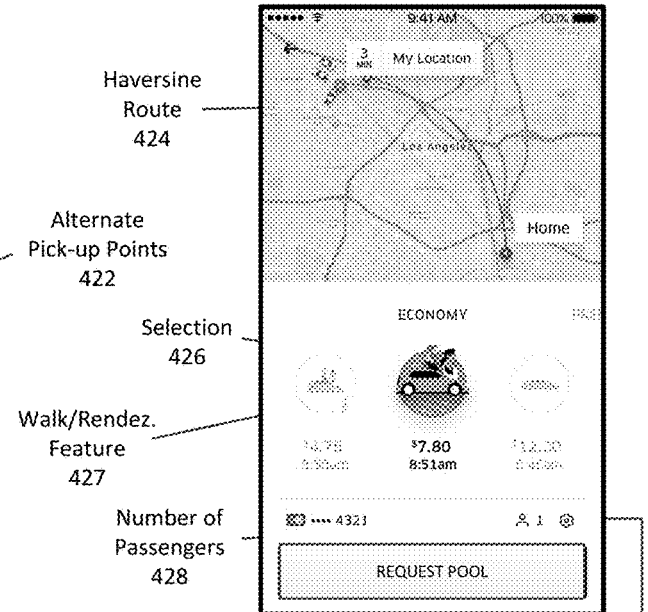
Figure 4G:
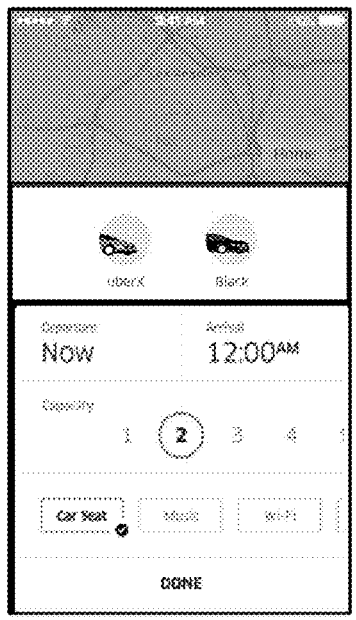
Figure 4H:
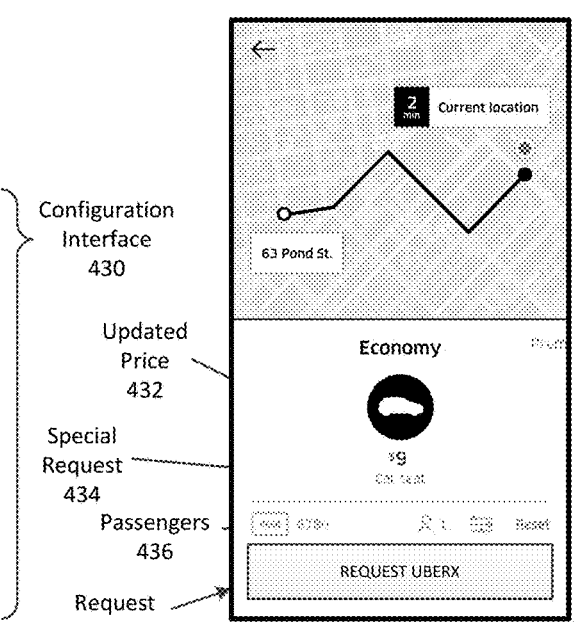

FIG. 4F shows a selection 426 of a carpooling graphic feature. Also shown in FIG. 4F is a walk/rendezvous feature 427 that offers the user a less expensive option, but may require longer waiting time and/or the user walking or traveling a certain distance. In one example, selection of the walk/rendezvous feature 427 can cause the map content showing an alternate pick-up point 422 to be displayed. In some variations, the network computer system 290 can utilize carpooling routes and additional trip data (e.g., available seats in carpool service providers' vehicles) to perform an optimization operation, which can comprise a cost, time, and/or walking distance optimization to converge on a particular combination of price, walking distance to a service location, and wait time—in addition to improving high level ride service flows of the service providers through traffic. Thus, the walk/rendezvous feature 427 can represent a ride-pooling service with the foregoing optimization, and can be selectable to request the optimized carpooling service.

Additionally, the walk/rendezvous feature 427 can further cause a tolerance interface to be displayed (not shown) that enables the user to specify certain tolerance parameters that can further affect the price, pick-up time, and/or ride time. In some aspects, the tolerance parameters inputted by the user can be factored into the optimization operation in order to provide the information shown in connection with the walk/rendezvous feature 427 (e.g., price, ETD, walking distance, and the like).

In certain implementations, selection of either the walk/rendezvous feature 427 or the standard carpooling feature (selection 426) can switch from the proposed route 416 shown in FIG. 4C, to a Haversine route 424 as shown in FIG. 4F. In certain implementations, selection of the other ride service options (i.e., personalized ride services) can cause the service application 232 to switch back to a proposed route 416. In some aspects, the switch between proposed route 416 and Haversine route 424 can be due to the actual route being unknown or calculated on the fly for carpooling services. In other examples, when the route is known, the service application 232 can display a carpooling route and the specified stops (i.e., pick-up and/or drop-off location) along the route.

FIG. 4F also shows a number of passengers 428 or requested seats for the selected ride service option. In some examples, the number of passengers feature 428 can be displayed when the user selects a carpooling service. In variations, the number of passengers feature 428 can be persistently displayed. The service application 232 can further display a configuration feature 429 that the user can selection to cause the configuration interface 430 to be displayed, as shown in FIG. 4G. According to examples provided herein, the configuration interface 430 enables the user to configure various aspects of the ride, and can allow the user to make additional requests, such as a number of seats, a baby or toddle car seat, music or other audio or video configurations, Wi-Fi access, and the like. As shown in FIG. 4G, the user has requested accessibility for two passengers and a baby car seat for the ride.

Once the user has configured the ride using the configuration interface, the network computer system 290 and/or service application 232 can display an updated ride selection interface showing updates corresponding to the user configurations. For example, the updated ride selection interface can display the updated price 432 based on the user configurations, the special request 434 (e.g., a baby car seat), and the required number of passengers 436. If the user is satisfied with the configurations and updated price 432, the user can select the request feature 438 to cause a pick-up request to be transmitted to the network computer system 290, which can select an optimal driver satisfying the ride service option, user configurations, and/or tolerance parameters to service the requested ride.

Figure 4I:
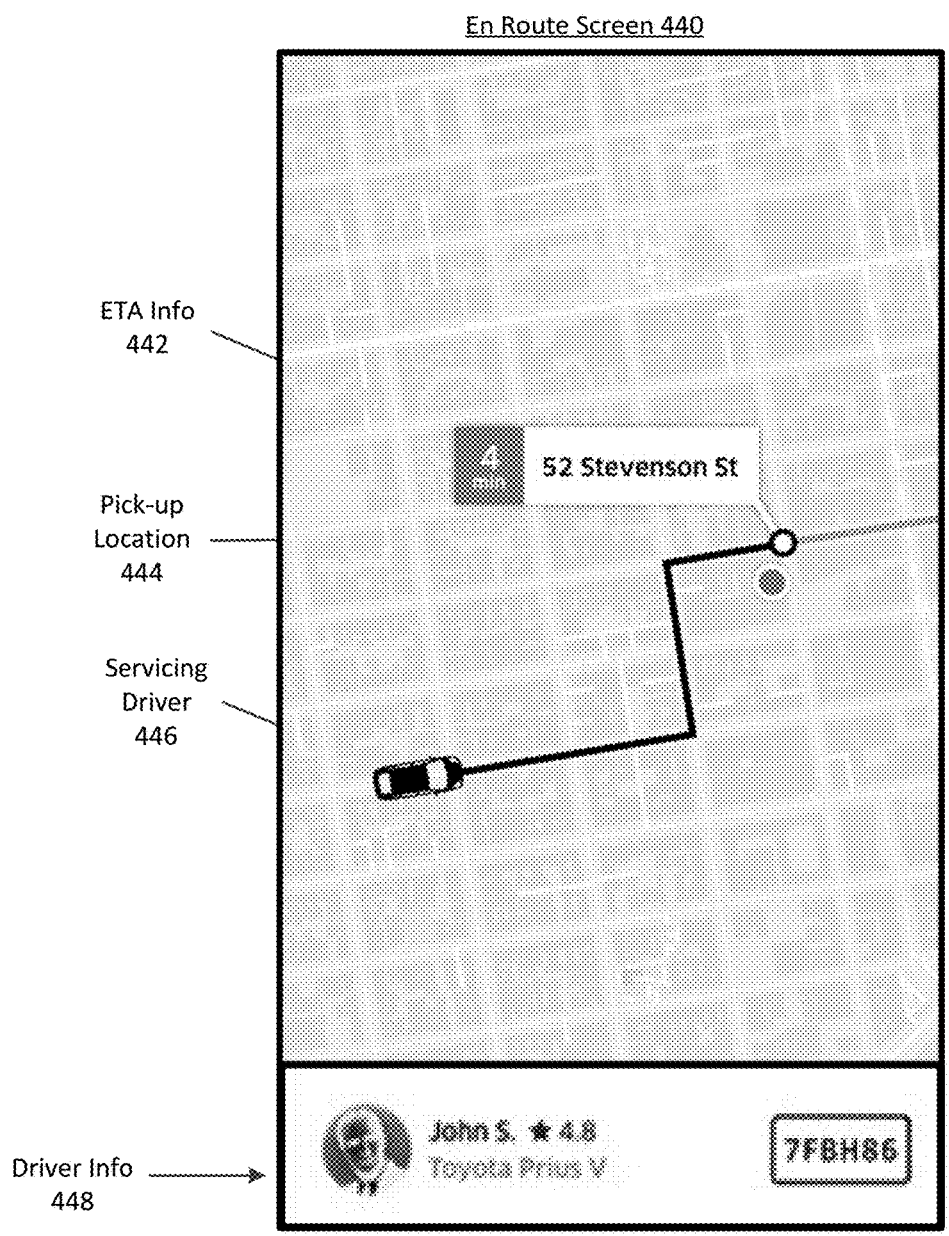

FIG. 4I illustrates an "en route" screen 440 generated once a pick-up request has been submitted and a servicing driver 446 has been selected. In certain aspects, the en route screen 440 can be generated as a subsequent screen in response to a driver being selected to service a pick-up request. The en route screen 440 can include a pick-up location 444 as well as the user's current location, and estimated time of arrival information 442 for the servicing driver 446. In many aspects, the en route screen 440 can further include driver information 448 such as the servicing driver's 446 name, vehicle type, and license plate number. Furthermore, the various features of the en route screen can also overlay or be included with map content.

Methodology

In the below discussions of FIGS. 5 and 6, reference may be made to reference characters representing like features as shown and described with respect to FIGS. 1 through 4I. Furthermore, the processes described with respect to FIGS. 5 and 6 below may be performed by an example network computer system 100, 290, a requester device 170, 200 executing a service application 175, 232 or a combination of the requester device 170, 200 executing the service application 175, 232 and the network computer system 100, 290 described herein.

Figure 5:
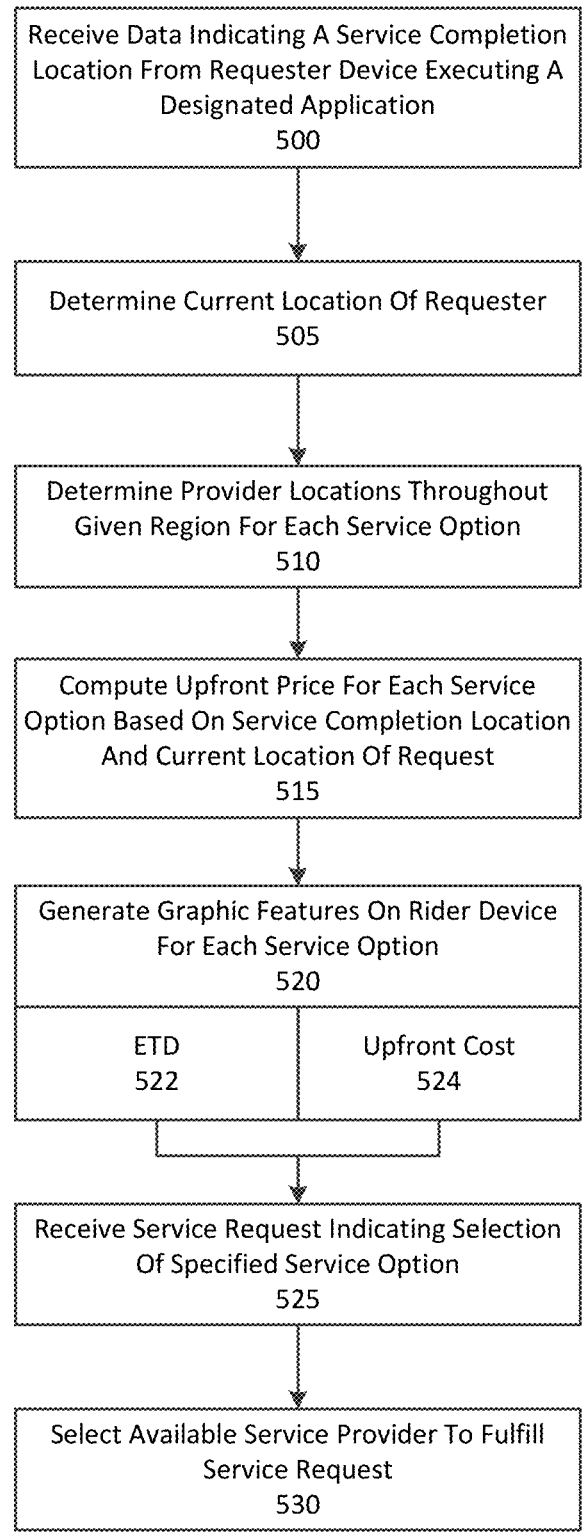
FIG. 5 is a flow chart describing an example method of providing upfront data to facilitate user selection in connection with an on-demand network-based service, according to examples described herein.

FIG. 5 is a flow chart describing an example method of providing upfront data to facilitate service provider selection in connection with an on-demand network-based service, according to examples described herein. Referring to FIG. 5, the network computer system 100 can receive data indicating a service completion location 172 from a requester device executing a designated service application 175 for an on-demand service managed by the network computer system 100 (500). The network computer system can further determine the current location 173 of the requester device 170 (e.g., via location-based resources of the requester device 170) (505). Still further, the network computer system 100 can determine service provider locations 113 throughout the given region for each of a plurality of service options, described herein (510).

Utilizing at least the inputted service completion location 172 and the current location of the requesting user 174, the network computer system 100 can compute an upfront price for each service option (515). The network computer system 100 can then generated graphic features 408 for display on a user interface 152 of the requester device 170 for each service option (520) As provided herein, each graphic feature 408 can include an upfront cost 402 for a requested service for that particular service option (524). Additionally or alternatively, one or more of the graphic features 408 can include an estimated time to destination (ETD) 403 corresponding to a time of completion for the selected service between the user 174 and a representative service provider for the service option at the rendezvous location (522). In various implementations, the network computer system 100 can receive a service request 171 indicating a service option selection (525). The network computer system 100 may then select an available or optimal service provider 189 qualified for the selected service option to fulfill the service request 171 (530).

Figure 6:
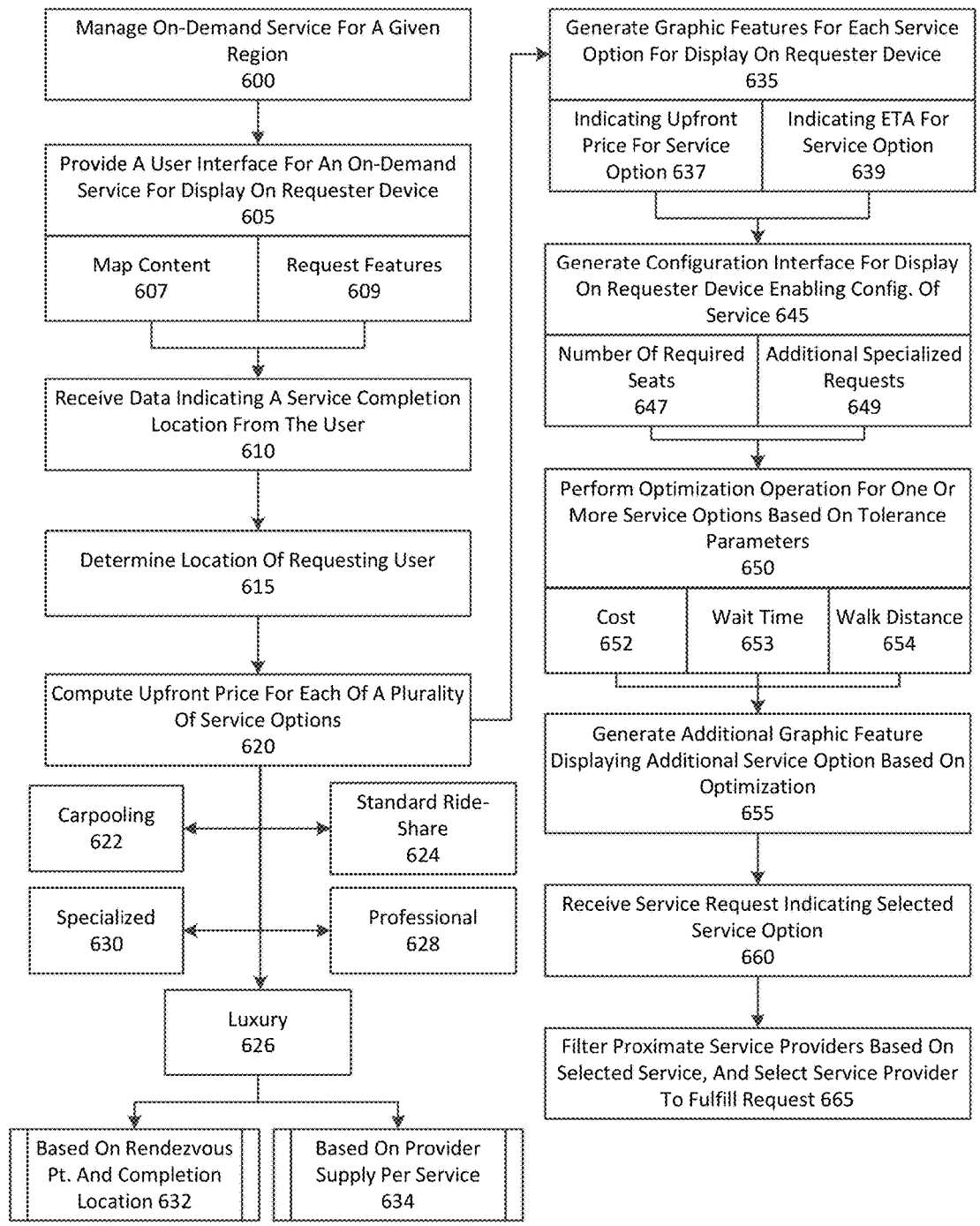
FIG. 6 is another flow chart describing an example method of providing upfront data to facilitate user selection in connection with an on-demand network-based service, according to examples described herein.

FIG. 6 is another flow chart describing an example method of providing upfront data to facilitate user selection in connection with an on-demand network-based service, according to examples described herein. The network computer system 100 can manage an on-demand service for a given region (600). In doing so, the network computer system 100 can match available service providers 184 with requesting users 174, providing a variety of service options at a corresponding variety of cost metrics. The network computer system 100 may provide a user interface 152 for the on-demand service for display on the requester devices 170 (e.g., via execution of a service application 175) (605). In various examples, the user interface 152 can provide map content 124 enabling the user to view a surrounding area and the service environment, such as graphic representations of available service providers 184 operating within proximity of the user, and/or dedicated graphic representations of service providers representing the various service options (607). Additionally or alternatively, the user interface 152 can further display a number of request features that enables the requesting user 174 to transmit a service request 171 to the network computer system 100 (609).

As illustrated in the screenshots provided herein, the request features can include a service completion location (or destination) input box 303 that enables the user 174 to type a destination 172, or can include a voice feature that enables the user to speak a destination 172. In variations, the user interface 152 can display a home screen that includes a number of accelerator features 308 that enable the user to automatically configure a service request 171 with predetermined completion locations 172 and/or ride service options—cutting down on request steps. In further variations, the request features can further enable the requesting user 174 to input a rendezvous location, for example, by setting a location pin or typing or voicing a rendezvous location. As further provided herein, the request features can include a number of graphic features 408 indicating specified service options with information for each service option (e.g., price data and ETD data).

According to examples described herein, the network computer system 100 can receive data indicating a service completion location from the requesting user 174 (610). Such information can be received over one or more networks established via execution of the service application 175 on the requesting user's computing device 170. The network computer system 100 can further determine the current location of the user 174, for example, via location-based resources of the requester device 170 (615). The network computer system 100 may then compute an upfront price 402 for each available service option (620). In various implementations, the computation of the upfront price 402 can be performed by the network computer system 100 automatically without inquiry by the requesting user 174 using only limited information, such as the rendezvous location or current location 173 of the user 174 and the service completion location 172 (632), and/or the supply of service providers 184 for each service option (634). In certain variations, the price computation for each service option can be performed as a background, dynamic process and can be continuously or periodically updated on graphic features 408 displayed on the requester device 170 (e.g., once every ten seconds).

Furthermore, individual computations may be performed for each service option, such as one or more carpooling services (622), a standard ride-sharing service (624), one or more specialized services (e.g., disabled access, high capacity vehicles, bike rack, roof rack, foreign language, and the like) (630), a professional driver service (628), and/or a luxury or premium vehicle service (626). Still further, the network computer system 100 can receive the service provider locations 113 (e.g., via location-based or GPS resources of the service provider devices 180) to determine an ETD 403 for at least one of the service options. In some aspects, the network computer system 100 can calculate the ETD 403 for a specified service option by utilizing one or more representative service providers for that service option. Thus, the ETD 403 can be an actual ETD 403 for a single representative service provider, or can be an averaged ETD 403 based on the locations of multiple service providers for that service option, routing information, and/or current or expected traffic information 139.

As described herein, the network computer system 100 can further generate graphic features 408 for each service option to be displayed on the user interface 152 of the requester device 170 (635). In addition to specifying the service option, each graphic feature 408 can also indicate the upfront price 402 for the service option (637), and/or the calculated ETD 403 for the service option (639). In certain implementations, the user interface 152 can further provide a selectable configuration feature 412 that enables the user to configure various aspects of the selected service option (645), such as a number of seats required (647) and/or additional specialized requests (e.g., Wi-Fi access, audio or video settings, a baby car seat, a bike rack, roof racks, and the like) (649). In certain implementations, the network computer system 100 can update the calculated price 402 and/or ETD 403 on the graphic feature 408 based on the user configurations 177.

In some aspects, the network computer system 100 can also perform an optimization operation for one or more service options based on tolerance parameters (650). According to such aspects, the network computer system 100 can perform the optimization operation in response to user inputs of tolerance parameters (e.g., on a tolerance interface of the service application 175), or preemptively and independently based on the service provider supply conditions (e.g., number of service providers, service provider routes and locations, etc.). In one example, the network computer system 100 preemptively performs the optimization operation for the carpooling service to provide the user 174 with an additional, lower cost option if the requesting user is, for example, willing to walk a certain distance and/or willing to wait for a relatively longer period of time.

In performing the optimization operation, the network computer system 100 can optimize cost for the requesting user 174 (652). For example, the network computer system 100 can identify service provider routes of carpool service providers, and instead of rerouting a closest available carpooling service provider, the network computer system 100 may identify one or more additional service providers on current routes that will pass close to the current location 173 of the user 174. The cost calculation for a minor detour of such service providers versus a relatively major detour for a closer service provider may result in an overall lower cost, but higher wait time, for the user 174. However, examples described herein recognize that a cost optimization alone may result in unreasonable wait times and/or walking distances for the user 174.

Thus, in addition to the cost optimization, the network computer system 100 can also perform a wait time optimization (653) and a walking distance or travel optimization for the user 174 (654). According to examples, the combination of cost savings, wait time, and walk time optimizations can cause the network computer system 100 to converge on an optimal alternative rendezvous location for the user 174 that is a certain walking distance away from the requesting user's current location 173, requiring a certain wait time, and saving the user 174 a certain amount in costs. Once the optimization operation is performed, the network computer system 100 can generate an additional graphic feature (e.g., the walk/rendezvous feature 427 shown in FIG. 4F) displaying an additional service option based on the optimization (655). As provided herein, the additional service option graphic can display an upfront price 402 and/or an ETD 403 for the additional service option (e.g., the walk/rendezvous service option). Furthermore, a user selection of this service option can cause a mapping interface to be displayed indicating a walking route for the requesting user to meet the service provider at the optimal rendezvous location (e.g., for pick-up and transportation to a destination).

In various implementations, the network computer system 100 may then receive a service request 171 indicating the selected service option (660). In response to the service request 171, the network computer system 100 can filter the available service providers 184 based on the selected ride service option, and select an optimal service provider 189 from the remaining candidate service providers to service the service request 171 (665). In selecting the service provider 189, the network computer system 100 can further generate and transmit a service invitation 132 to the selected service provider 189, which the service provider 189 can accept or decline. If the service provider accepts, the network computer system 100 can transmit a confirmation 134 back the user 174. However, if the selected service provider 189 rejects the invitation 132, the network computer system 100 can determine a second set of candidates and make another selection of a most optimal service provider from the second candidate set.

Hardware Diagram

Figure 7:
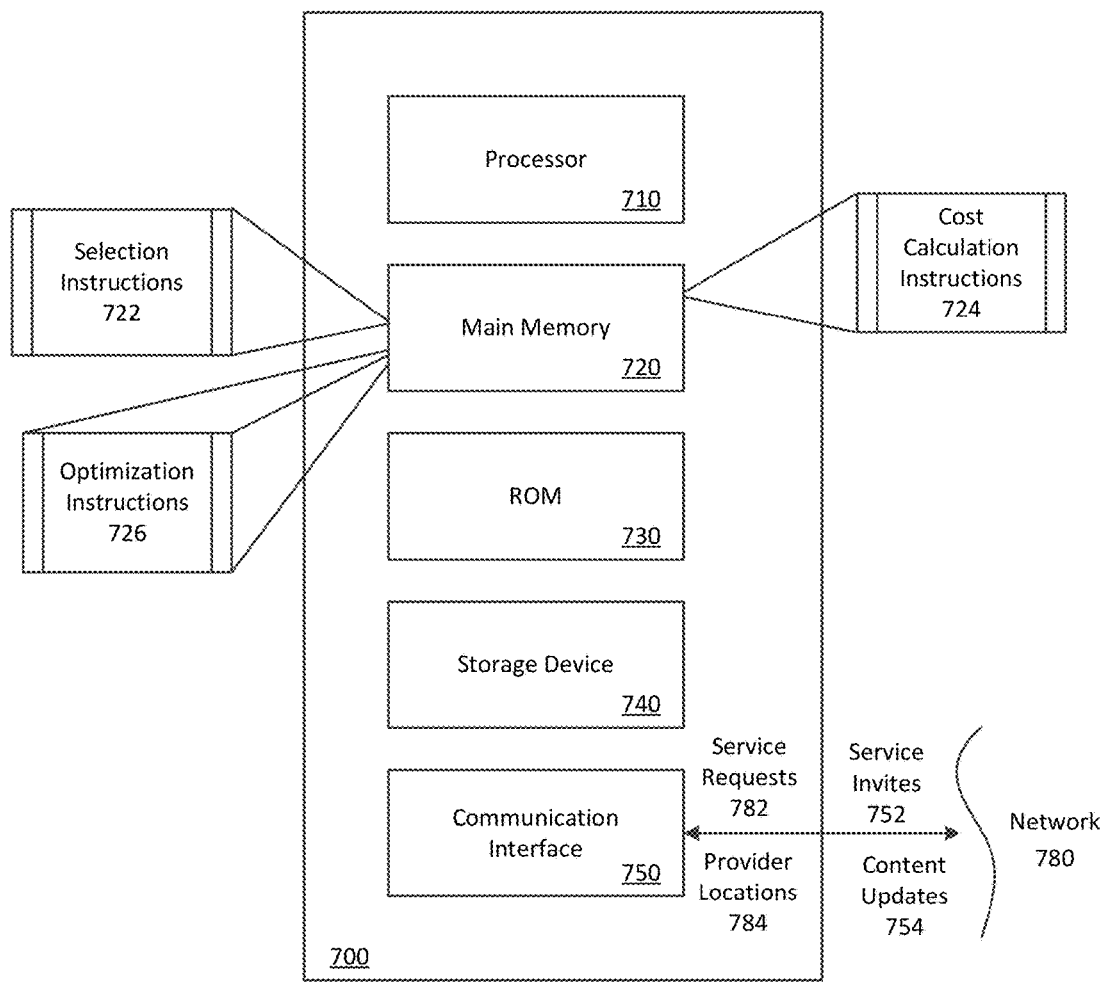
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented for providing on-demand services. In the context of FIG. 1, the network computer system 100 may be implemented using a computer system 700 such as described by FIG. 7. The network computer system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, and/or one or more self-driving vehicles. In accordance with examples, the computer system 700 receives service requests 782 from mobile computing devices of individual users. The executable instructions stored in the memory 730 can include selection instructions 722, which the processor 710 executes to select an optimal service provider to service the service request 782. In doing so, the computer system can receive service provider locations 784 of service providers operating throughout the given region, and the processor can execute the selection instructions 722 to select an optimal service provider from a set of available service providers, and transmit a service invitation 752 to enable the service provider to accept or decline the service offer.

The executable instructions stored in the memory 720 can also include cost calculation instructions 724, which enable the computer system 700 to dynamically compute prices based on an inputted service completion location by the user and a rendezvous location (e.g., based on the user's current location). As described herein, execution of the cost calculation instructions 724 can cause the computer system 700 to output an upfront price for each of a plurality of service options, and can further be based on service provider supply for the service option (e.g., with a shortage of supply resulting in a price surge factor). The executable instructions can further include optimization instructions 726, which enable the computer system 700 to perform cost, wait time, and/or walking distance optimizations (e.g., for a carpooling service option) in order to provide an additional walk/rendezvous service at a reduced cost to the user, as described herein. The results of the price calculations, updates, and optimizations can result in content updates 754 provided by the computer system 700 for display on the requester device. Such content updates 754 can comprise the screens, screen features, or update features of the service application executing on the requester device, including the selectable graphic features 408 providing price and ETD information for the service options.

By way of example, the instructions and data stored in the memory 720 can be executed by the processor 710 to implement an example network computer system 100 of FIG. 1. In performing the operations, the processor 710 can receive service requests 782 and service provider locations 784, and submit service invitations 752 to facilitate the servicing of the requests 782. Furthermore, execution of the cost calculation instructions 724 and optimization instructions 726 can cause the processor 710 to provide service information for each of the available ride service options managed by the network computer system 100.

The processor 710 is configured with software and/or other logic to perform one or more processes, steps and other functions described with implementations, such as described by FIGS. 1-6, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computer system implementing a transport service, comprising:
 a network communication interface to communicate, over one or more networks, with (i) a service application executing on computing devices of users of the transport service, and (ii) a transport provider application executing on computing devices of drivers of the transport service;

a database storing a user profile for each of the users, the user profile comprising historical data corresponding to historical usage of the transport service by the user;

one or more processors; and one or more memory resources storing instructions that, when executed by the one or more processors, cause the network computer system to:

receive, over the one or more networks, location data from the service application executing on a computing device of a requesting user of the transport service, the location data indicating a current location of the requesting user;

determine multiple destination locations for the requesting user based on the historical data in the user profile of the requesting user and the current location of the requesting user;

transmit, over the one or more networks, an instruction to the service application executing on the computing device of the requesting user, the instruction causing the service application to concurrently display a destination accelerator feature on a user interface of the service application for each of the multiple destination locations;

in response to receiving, over the one or more networks, data indicating a user input selecting a destination accelerator feature representing a specified one of the multiple destination locations:

based on location data received, over the one or more networks, from the transport service application executing on a computing device of a representative driver, determine, for a specified one of a plurality of transport options, a rendezvous point at which the requesting user can rendezvous with the representative driver based on an estimated time of arrival of the representative driver to the rendezvous point and an estimated travel time of the requesting user to the rendezvous point, the rendezvous point requiring the requesting user to travel a certain distance from the current location;

determine, for each transport option of the plurality of transport options, a guaranteed upfront cost for transporting the requesting user to the specified destination location, the guaranteed upfront cost for the transport option being based on (i) a set of cost data associated with the transport option, (ii) the current location of the requesting user, and (iii) the specified destination location, wherein the executed instructions cause the network computer system to further determine the rendezvous point to minimize the guaranteed upfront cost for the specified transport option; and transmit an update instruction, over the one or more networks, to the service application executing on the computing device of the requesting user, the update instruction causing the service application to display a ride service selection interface, the ride service selection interface concurrently displaying a plurality of graphic features, each graphic feature of the plurality of graphic features indicating (i) a corresponding transport option, from the plurality of transport options, for transporting the requesting user to the specified destination location, and (ii) the guaranteed upfront cost for the corresponding transport option;

based on a user selection of a graphic feature, of the plurality of graphic features, representing the specified transport option, receive, over the one or more networks, a transport request for the specified transport option from the service application executing on the computing device of the requesting user;

receive, over the one or more networks, driver location data from the transport provider application executing on computing devices of one or more available drivers for the specified transport option, the driver location data indicating a current location of each of the one or more available drivers;

select a driver from the one or more available drivers based, at least in part, on an estimated time of arrival of the selected driver to the rendezvous point; and transmit a service invitation, over the one or more networks, to the transport provider application executing on the computing device of the selected driver, the service invitation enabling the selected driver to rendezvous with the requesting user at the rendezvous point to transport the requesting user to the specified destination location.

2. The network computer system of claim 1, wherein the executed instructions further cause the one or more processors to:

identify a plurality of candidate drivers within proximity of the current location of the requesting user, the plurality of candidate drivers being available to service each of the plurality of transport options; and determine an estimated time of completion for a representative driver for each respective transport option of the plurality of transport options.

3. The network computer system of claim 2, wherein the update instruction causes the service application to generate the graphic feature for each respective transport option to further include the estimated time of completion of the representative driver for the respective transport option.

4. The network computer system of claim 2, wherein the executed instructions further cause the one or more processors to:

identify a direction of travel for the representative driver of the specified transport option;

wherein the executed instructions further cause the network computer system to determine the rendezvous point based on the direction of travel.

5. The network computer system of claim 1, wherein the executed instructions further cause the one or more processors to:

transmit, over the one or more networks, display data to the service application, causing a configuration feature to be displayed on the computing device of the requesting user; and in response to a user selection of the configuration feature, transmit, over the one or more networks, configuration data to the service application, causing the service application to display a configuration interface on the user interface, the configuration interface including a set of features enabling the requesting user to configure one or more parameters of a selected one of the plurality of transport options.

6. The network computer system of claim 5, wherein the plurality of transport options comprises a carpooling service, and wherein the one or more parameters comprise a number of required seats for the carpooling service.

7. The network computer system of claim 6, wherein the executed instructions further cause the one or more processors to:

re-compute the guaranteed upfront cost of the carpooling service based on the number of required seats selected by the requesting user on the configuration interface; and update the graphic feature corresponding to the carpooling service on the user interface to display the re-computed guaranteed upfront cost.

8. The network computer system of claim 5, wherein the one or more parameters comprise at least one of a Wi-Fi access request or audio configurations for the selected transport option.

9. The network computer system of claim 5, wherein the executed instructions further cause the one or more processors to:

on the configuration interface, cause the service application to query the requesting user for a set of tolerance parameters; and re-compute a guaranteed upfront cost for at least one of the transport options based on the set of tolerance parameters.

10. The network computer system of claim 9, wherein the at least one transport option comprises a carpooling service in which a single driver can transport multiple users, and wherein the set of tolerance parameters includes at least one of a flexible start time, a flexible drop-off time, or a flexible travel time.

11. The network computer system of claim 1, wherein the plurality of transport options comprises a plurality of:

a carpooling service, a standard ride sharing service, a luxury vehicle service, a high capacity vehicle service, a professional driver service, or a self-driving vehicle service.

12. A non-transitory computer readable medium storing instructions that, when executed by one or more processors of a network computer system, cause the one or more processors to:

communicate, over one or more networks, with (i) a service application executing on computing devices of users of a transport service, and (ii) a transport provider application executing on computing devices of drivers of the transport service;

store, in a database, a user profile for each of the users, the user profile comprising historical data corresponding to historical usage of the transport service by the user;

receive, over the one or more networks, location data from the service application executing on a computing device of a requesting user of the transport service, the location data indicating a current location of the requesting user;

determine multiple destination locations for the requesting user based on the historical data in the user profile of the requesting user and the current location of the requesting user;

transmit, over the one or more networks, an instruction to the service application executing on the computing device of the requesting user, the instruction causing the service application to concurrently display a destination accelerator feature on a user interface of the service application for each of the multiple destination locations;

in response to receiving, over the one or more networks, data indicating a user input selecting a destination accelerator feature representing a specified one of the multiple destination locations:

based on location data received, over the one or more networks, from the transport service application executing on a computing device of a representative driver, determine, for a specified one of a plurality of transport options, a rendezvous point at which the requesting user can rendezvous with the representative driver based on an estimated time of arrival of the representative driver to the rendezvous point and an estimated travel time of the requesting user to the rendezvous point, the rendezvous point requiring the requesting user to travel a certain distance from the current location;

determine, for each transport option of the plurality of transport options, a guaranteed upfront cost for transporting the requesting user from a rendezvous location to the specified destination location, the guaranteed upfront cost for the transport option being based on (i) a set of cost data associated with the transport option, (ii) the current location of the requesting user, and (iii) the specified destination location, wherein the executed instructions cause the network computer system to further determine the rendezvous point to minimize the guaranteed upfront cost for the specified transport option; and transmit an update instruction, over the one or more networks, to the service application executing on the computing device of the requesting user, the update instruction causing the service application to display a ride service selection interface, the ride service selection interface concurrently displaying a plurality of graphic features, each graphic feature of the plurality of graphic features indicating (i) a corresponding transport option, from the plurality of transport options, for transporting the requesting user to the destination location, and (ii) the guaranteed upfront cost for the corresponding transport option;

based on a user selection of a graphic feature, from the plurality of graphic features, representing the specified transport option, receive, over the one or more networks, a transport request for the specified transport option from the service application executing on the computing device of the requesting user;

receive, over the one or more networks, driver location data from the transport provider application executing on computing devices of one or more available drivers for the specified transport option, the driver location data indicating a current location of each of the one or more available drivers;

select a driver from the one or more available drivers based, at least in part, on and estimated time of arrival of the selected driver to the rendezvous point; and transmit a service invitation, over the one or more networks, to the transport provider application executing on the computing device of the selected driver, the service invitation enabling the selected driver to rendezvous with the requesting user at the rendezvous point to transport the requesting user to the specified destination location.

13. The non-transitory computer readable medium of claim 12, wherein the executed instructions further cause the one or more processors to:

identify a plurality of candidate drivers within proximity of the current location of the requesting user, the plurality of candidate drivers being available to service each of the plurality of transport options; and determine an estimated time of completion for a representative driver for each respective transport option of the plurality of transport options.

14. The non-transitory computer readable medium of claim 13, wherein the update instruction causes the service application to generate the graphic feature for each respective transport option to further include the estimated time of completion of the representative driver for the respective transport option.

15. The non-transitory computer readable medium of claim 13, wherein the executed instructions further cause the one or more processors to:
identify a direction of travel for the representative driver of the specified transport option;
wherein the executed instructions further cause the one or more processors to determine the rendezvous point based on the direction of travel.

16. A computer-implemented method of facilitating transportation, the method being performed by one or more processors of a network computer system and comprising:
communicating, over one or more networks, with (i) a service application executing on computing devices of users of a transport service, and (ii) a transport provider application executing on computing devices of drivers of the transport service;
storing, in a database, a user profile for each of the users, the user profile comprising historical data corresponding to historical usage of the transport service by the user;
receiving, over the one or more networks, location data from the service application executing on a computing device of a requesting user of the transport service, the location data indicating a current location of the requesting user;
determining multiple destination locations for the requesting user based on the historical data in the user profile of the requesting user and the current location of the requesting user;
transmitting, over the one or more networks, an instruction to the service application executing on the computing device of the requesting user, the instruction causing the service application to concurrently display a destination accelerator feature on a user interface of the service application for each of the multiple destination locations;
in response to receiving, over the one or more networks, data indicating a user input selecting a destination accelerator feature representing a specified one of the multiple destination locations:
based on location data received, over the one or more networks, from the transport service application executing on a computing device of a representative driver, determining, for a specified one of a plurality of transport options, a rendezvous point at which the requesting user can rendezvous with the representative driver based on an estimated time of arrival of the representative driver to the rendezvous point and an estimated travel time of the requesting user to the rendezvous point, the rendezvous point requiring the requesting user to travel a certain distance from the current location;
determining, for each transport option of the plurality of transport options, a guaranteed upfront cost for transporting the requesting user to the specified destination location, the guaranteed upfront cost for the transport options being based on (i) a set of cost data associated with the transport option, (ii) the current location of the requesting user, and (iii) the specified destination location wherein the one or more processors further determine the rendezvous point to minimize the guaranteed upfront cost for the specified transport option; and
transmitting an update instruction, over the one or more networks, to the service application executing on the computing device of the requesting user, the update instruction causing the service application to display a ride service selection interface, the ride service selection interface concurrently displaying a plurality of graphic features, each graphic feature of the plurality of graphic features indicating (i) a corresponding transport option, from the plurality of transport options, for transporting the requesting user to the specified destination location, and (ii) the guaranteed upfront cost for the corresponding transport option;
based on a user selection of a graphic feature, from the plurality of graphic features, representing the specified transport option, receiving, over the one or more networks, a transport request for the specified transport option from the service application executing on the computing device of the requesting user;
receiving, over the one or more networks, driver location data from the transport provider application executing on computing devices of one or more available drivers, the driver location data indicating a current location of each of the one or more available drivers;
selecting a driver from the one or more available drivers based, at least in part, on an estimated time of arrival of the selected driver to the rendezvous point; and
transmitting a service invitation, over the one or more networks, to the transport provider application executing on the computing device of the selected driver, the service invitation enabling the selected driver to rendezvous with the requesting user at the rendezvous point to transport the requesting user to the specified destination location.

* * * * *